United States Patent
Paquet et al.

(10) Patent No.: US 8,636,923 B2
(45) Date of Patent: Jan. 28, 2014

(54) PRODUCTION OF SYNTHESIS GAS BY HEATING OXIDIZED BIOMASS WITH A HOT GAS OBTAINED FROM OXIDATION OF RESIDUAL PRODUCTS

(75) Inventors: Antonin Paquet, Edmonton (CA); Martin Gagnon, Sherbrooke (CA); Esteban Chornet, Sherbrooke (CA)

(73) Assignee: Enerkem, Inc., Montreal (CA)

( * ) Notice: Subject to any disclaimer, the term of this patent is extended or adjusted under 35 U.S.C. 154(b) by 0 days.

(21) Appl. No.: 13/317,209

(22) Filed: Oct. 12, 2011

(65) Prior Publication Data

US 2013/0026417 A1 Jan. 31, 2013

Related U.S. Application Data

(60) Provisional application No. 61/455,992, filed on Oct. 29, 2010.

(51) Int. Cl.
*C01B 3/02* (2006.01)
*C01B 3/36* (2006.01)
(52) U.S. Cl.
USPC ............................................................ 252/373
(58) Field of Classification Search
None
See application file for complete search history.

(56) References Cited

U.S. PATENT DOCUMENTS 6,063,355 A * 5/2000 Fujimura et al. ............... 423/359
2008/0155899 A1 * 7/2008 Ramamurthy .................... 48/77

FOREIGN PATENT DOCUMENTS

| JP | 11294726 A | 10/1999 |
| JP | 200441848 A | 2/2004 |
| JP | 2006316170 A | 11/2006 |
| WO | 2009132449 A1 | 11/2009 |
| WO | 2010069068 A1 | 6/2010 |

* cited by examiner

*Primary Examiner* — Melvin C Mayes
*Assistant Examiner* — Douglas Call
(74) *Attorney, Agent, or Firm* — Elliot M. Olstein; Raymond J. Lillie

(57) ABSTRACT

A process for producing synthesis gas, or syngas, from biomass. The process comprises contacting biomass with oxygen, or oxygen and steam, in an amount effective to oxidize the biomass and to heat the biomass to a temperature no greater than 750° C. At least one combustible material also is contacted with oxygen and steam to heat the at least one combustible material to a temperature of at least 1,100° C., to provide a hot gas derived from the oxidized combustible material. The latter maybe residual products derived from the process itself as char, tar, or hydrocarbons. The oxidized biomass then is contacted with the hot flue gas to heat the biomass to a temperature of at least 900° C., thereby producing synthesis gas. The synthesis gas then is recovered. Such process provides a method of providing heat for producing synthesis gas without consuming a portion of the synthesis gas to provide such heat, thereby providing an increased yield of synthesis gas.

27 Claims, 4 Drawing Sheets

PRODUCTION OF SYNTHESIS GAS BY HEATING OXIDIZED BIOMASS WITH A HOT GAS OBTAINED FROM OXIDATION OF RESIDUAL PRODUCTS

This application claims priority based on provisional application Ser. No. 61/455,992, filed Oct. 29, 2010, the contents of which are incorporated by reference in their entirety.

This invention relates to the production of synthesis gas from biomass. More particularly, this invention relates to the production of syngas by contacting biomass with oxygen and steam to provide an oxidized biomass, and then heating the oxidized biomass with hot gas (which may be produced by the oxidation of residual products) to provide synthesis gas.

A wide range of heterogeneous biomass-rich feedstocks can be gasified in a fluidized bed gasifier to product synthesis gas, or syngas, comprising hydrogen and carbon monoxide. These gases can be converted to a variety of liquid fuels or to electricity. The syngas exiting the gasifier also contains various carbon containing gaseous and solid by-products in addition to the hydrogen and carbon monoxide. The carbon contained in these by-products represents a loss in yield for the process, and results in expenses with respect to gas treatment. Such by-products include, but are not limited to, carbon dioxide, light hydrocarbon gases such as methane, ethane, ethylene, propylene, and propane, oxygenates such as methanol, ethanol, butanol, methyl and ethyl acetate, acetic acid, and dimethyl ester, as well as higher molecular weight organics (i.e., "tar"), and carbonaceous solids (i.e., "char").

Fluidized bed gasifiers, however, cannot be operated at sufficiently high temperatures for converting the by-products totally. In order to avoid agglomeration in the fluidized bed, the maximum temperature in the fluidized bed gasifier cannot exceed the softening temperature of the ashes of the biomass. Any increase in temperature needed for further conversion of the carbon-containing by-products must take place downstream of the fluidized bed.

The by-products may be reacted with steam or carbon dioxide to produce syngas in a process called reforming. Reforming may be used in combination with the water gas shift reaction to produce hydrogen from methane. Reforming may be conducted in the presence of a catalyst, such as a nickel-based catalyst, to reform methane at a temperature of from about 700° C. to about 950° C. When a catalyst is not employed, the reforming of methane is efficient only if conducted at temperatures over 1,300° C.

In general, methane is the most refractory hydrocarbon present in primary, or untreated, syngas, and it may be recovered as residual gas in downstream units. Other carbon-containing by-products, such as ethane, propane, tar, and char, are less refractory than methane, and can be converted to syngas at temperatures which are between those of catalytic reforming (700° C. or above) and the higher temperatures of thermal reforming of methane (up to 1,300° C.).

Reforming is an endothermic, or heat consuming process. Additional heat is necessary to balance the endothermic reforming reactions in order to heat the gas from the gasifying temperature at the fluid bed to the reforming temperature and to compensate for thermal losses. Heat usually is provided to the reformer either directly, i.e., by oxidizing a portion of the syngas, or indirectly through high temperature heat exchangers.

It is an object of the present invention to provide a process for increasing the conversion of light hydrocarbons, such as methane, ethane, and propane, as well as tar and char, to syngas through reforming that provides for reduced consumption of syngas to provide the heat needed for such reforming.

In accordance with an aspect of the present invention, there is provided a process for producing synthesis gas, or syngas, from biomass. The process comprises contacting the biomass with oxygen in an amount effective to oxidize the biomass and to heat the biomass to a temperature no greater than 750° C. An oxidized biomass including a primary synthesis gas thus is produced. In order to heat the oxidized biomass including the primary synthesis gas to a higher temperature required for reforming, at least one combustible material then is contacted with oxygen to oxidize the at least one combustible material and produce a gas at a temperature of at least 1,100° C., thereby providing a hot oxidized gas. The oxidized biomass including the primary synthesis gas then is contacted with the hot oxidized gas to heat the oxidized biomass including the primary synthesis gas to a temperature of at least 900° C., thereby reforming the primary synthesis gas. The synthesis gas then is recovered.

Biomass-rich materials which may be gasified in accordance with the present invention include, but are not limited to, homogeneous biomass-rich materials, non-homogeneous biomass-rich materials, heterogeneous biomass-rich materials, and urban biomass.

In general, homogeneous biomass-rich materials are biomass-rich materials which come from a single source. Such materials include, but are not limited to, materials from coniferous trees or deciduous trees of a single species, agricultural materials from a plant of a single species, such as hay, corn, or wheat, for example, primary sludge from wood pulp, and wood chips and wood pellets.

Non-homogeneous biomass-rich materials in general are materials which are obtained from plants of more than one species. Such materials include, but are not limited to, forest residues from mixed species, and tree residues from mixed species obtained from debarking operations or sawmill operations.

Heterogeneous biomass-rich materials in general are materials that include biomass and non-biomass materials such as plastics, metals, textiles, hydrocarbon compounds, and multi-material residues, and/or contaminants such as sulfur, halogens, or non-biomass nitrogen contained in compounds such as inorganic salts or organic compounds. Examples of such heterogeneous biomass-rich materials include, but are not limited to, urban biomass such as municipal solid waste, such as refuse derived fuel, solid recovered fuel, sewage sludge, industrial-commercial-institutional (ICI) waste, construction and demolition (C & D) waste, used electrical transmission poles and railroad ties, which may be treated with creosote, pentachlorophenol, or copper chromium arsenate, and wood from construction and demolition operations which may contain one or more of the above chemicals as well as paints and resins.

In a non-limiting embodiment, prior to the contacting of the biomass with oxidizing gas in the first step, the biomass is admixed with at least one additive material, which neutralizes impurities such as chlorine, fluorine, and sulfur, which may be present in the biomass. In a non-limiting embodiment, the at least one additive is at least one adsorbent material. Such adsorbent materials include, but are not limited to, calcium oxide, or mixtures of calcium oxide, calcined limestone, ash materials, iron, waste concrete, silica sand, olivine (a silicate of iron and magnesium), and mixtures of calcium and magnesium oxides.

In another non-limiting embodiment, the at least one additive material is added to the biomass in an amount of from about 1.5 to about 2.0 times the stoichiometric quantity required for full neutralization of chlorine and other halogens, as well as sulfur present in the biomass. The term "neutralization," as used herein, includes the formation of stable salts such as $CaCl_2$, CaS, and the corresponding salts of magnesium and iron.

In the first step, the biomass is contacted with the oxidizing gas under conditions which effect a partial oxidation of the biomass. As a result of such partial oxidation, the biomass decomposes thermally, and there are produced a solid carbonaceous residue, gases such as $CO_2$, steam, carbon monoxide, hydrogen, and vapors of intermediate species such as low molecular weight saturated and non-saturated linear hydrocarbons, and aromatic hydrocarbons, and phenolics such as phenol, catechols, and methoxylated, alkylated, and alkoxylated phenols.

In a non-limiting embodiment, the biomass is contacted with oxygen in an amount effective to oxidize the biomass and to heat the biomass to a temperature of from about 600° C. to about 750° C. In another non-limiting embodiment, the biomass is heated to a temperature of from about 700° C. to about 750° C.

In a non-limiting embodiment, the biomass is contacted with oxygen at a weight ratio of oxygen to biomass of from about 0.15 to about 0.35 of the stoichiometric weight ratio needed for complete combustion of the biomass. In another non-limiting embodiment, the biomass is contacted with oxygen at a weight ratio of oxygen to biomass of from about 0.20 to about 0.35 of the stoichiometric weight ratio needed for complete combustion of the biomass. In yet another non-limiting embodiment, the biomass is contacted with oxygen at a weight ratio of oxygen to biomass at about 0.25 of the stoichiometric weight ratio needed for complete combustion of the biomass.

In another non-limiting embodiment, the biomass is contacted with oxygen and steam in an amount effective to oxidize the biomass and to heat the biomass as hereinabove described. In another non-limiting embodiment, the biomass is contacted with oxygen, or with oxygen and steam, in the absence of nitrogen.

In another non-limiting embodiment, in the first step, the biomass is contacted with oxygen, or with oxygen and steam, in a bed of particulate material, whereby the passage of oxygen, or oxygen and steam, through such bed provides a fluidized bed of the particulate material. Such particulate materials include, but are not limited to, alumina, olivine, silica, dolomite, anthracite, desulfurized petroleum coke, and in general, any stable refractory material. In a non-limiting embodiment, the particulate material is selected from the group consisting of alumina, olivine, and silica. In another non-limiting embodiment, the particles have a diameter of from about 250 microns to about 850 microns.

In another non-limiting embodiment, the biomass is contacted, in the first step, with oxygen, or with oxygen and steam, for a period of time that does not exceed 4 seconds. In a further non-limiting embodiment, the biomass is contacted, in the first step, with oxygen, or with oxygen and steam, for a period of time that does not exceed 3 seconds. In yet another non-limiting embodiment, the biomass is contacted, in the first step, with oxygen, or with oxygen and steam, for a period of time that does not exceed 2 seconds.

Although the scope of the present invention is not intended to be limited to any theoretical reasoning, as the biomass is contacted with oxygen, or with oxygen and steam, in the first step, the biomass is oxidized partially, and is decomposed thermally, thereby producing a solid carbonaceous residue, gases such as $CO_2$, steam, and some carbon monoxide (CO) and hydrogen ($H_2$), and vapors of intermediate species such as low molecular weight saturated and unsaturated linear hydrocarbons, functionalized and condensed aromatic hydrocarbons, and phenolics as hereinabove described.

When the biomass is contacted with oxygen, or with oxygen and steam, in the first step, in the presence of a fluidized bed, the solid carbonaceous residue produced in the first step remains in the fluidized bed and provides the bulk of the exothermal heat of oxidation, thereby maintaining the fluidized bed at the temperatures hereinabove described. The oxygen used in the first step essentially is consumed in such step, while a portion of the carbonaceous residue formed during the first step is consumed as well, and another portion of the carbonaceous residue is entrained as char. The char particles also may contain inorganic materials initially present in the biomass feedstock.

Some cracking of intermediates, i.e., low molecular weight hydrocarbons, phenolics, and aromatics, may occur during the first step; however, higher temperatures are required to convert the residual carbon in the entrained char particles, and additionally to crack and reform the intermediate vapors containing the low molecular weight alkyl and aromatic hydrocarbons, and phenolics. The heat required for such conversion (which involves cracking and reforming) is provided by a hot gas, formed as a result of oxidizing the at least one combustible material.

In a non-limiting embodiment, the at least one combustible material is oxidized to reach a temperature of from about 1,100° C. to about 1,850° C. In another non-limiting embodiment, the combustible material is oxidized to reach a temperature of from about 1,500° C. to about 1,850° C.

Combustible materials which may be heated to provide a hot oxidized gas include, but are not limited to, hydrocarbons, including residual hydrocarbons derived from a biofuels synthesis process (including methane, ethylene, ethane, propylene, and propane and others), and residual oxygenates such as methanol, ethanol, methyl acetate, ethyl acetate, acetic acid, and dimethyl ester, and other aliphatic, cyclic, or aromatic hydrocarbons, tar, char, and mixtures thereof.

In a non-limiting embodiment, the at least one combustible material is a hydrocarbon. In another non-limiting embodiment, the hydrocarbon has 1 to 3 carbon atoms. In yet another non-limiting embodiment, the hydrocarbon is methane.

In a further non-limiting embodiment, the at least one combustible material includes at least one hydrocarbon and char.

In another non-limiting embodiment, the at least one combustible material is contacted with oxygen and steam in an amount effective to heat the combustible material and to provide a hot gas derived from the oxidized combustible material(s) as hereinabove described.

In a non-limiting embodiment, the at least one combustible material is contacted with oxygen, or with oxygen and steam, and is heated to a temperature of from about 1,500° C. to about 1,600° C. to provide a hot gas derived from the oxidized combustible materials. In one non-limiting embodiment, the at least one combustible material is contacted with oxygen, or with oxygen and steam, in the absence of nitrogen. During the oxidation of the at least one combustible material, oxygen is consumed such that elemental oxygen ($O_2$) is not present in the hot combustion gas formed, or such that elemental oxygen ($O_2$) is present in the hot gas in a molar amount sufficient to provide additional heat if needed to reach an adequate reforming temperature. In one non-limiting embodiment, all of the elemental oxygen is consumed during the oxidation of the at least one combustible material, whereby the resulting hot oxidized gas is free of oxygen.

In a non-limiting embodiment, a molar excess of the at least one combustible material is contacted with a substoichiometric amount of oxygen in an oxidizer, whereby the oxidizer acts as a small reformer or gasifier to produce additional syngas with materials that are too refractory to convert in a fluidized gasification bed or a reforming (or freeboard) section of a gasifier. Thus, one may convert materials that are more refractory than carbon monoxide and hydrogen (i.e., the main components of syngas), such as, for example, methane, heavy polyaromatic tars such as pyrene and anthracene, without increasing the temperature of the entire syngas and without increasing the temperature of the fluidized gasification bed or the reforming section of the gasifier excessively. The additional syngas thus produced is added to the reforming, or freeboard, zone of the gasifier along with the hot gas derived from the oxidized combustible material(s). The hot gas provides sufficient heat to the reforming, or freeboard zone, to attain sufficient reforming temperatures to effect steam and $CO_2$ driven reactions in the reforming, or freeboard, zone of the gasifier.

The oxidized biomass (i.e., the mixture of gases, tar, and char particulates) is contacted with such hot gas derived from the oxidized combustible material(s), whereby the oxidized biomass is heated to a temperature of at least 900° C. In a non-limiting embodiment, the oxidized biomass is heated to a temperature of from about 900° C. to about 1,200° C. In another non-limiting embodiment, the oxidized biomass is heated to a temperature of from about 1,000° C. to about 1,100° C.

Although the scope of the present invention is not to be limited to any theoretical reasoning, the heat that is required for heating the oxidized biomass to provide a synthesis gas, is provided by the hot gas derived from the oxidized combustible material(s), whereby one does not need to combust or oxidize a portion of the synthesis gas contained in the oxidized biomass in order to obtain the heat that is required for completing the conversion of the oxidized biomass to synthesis gas. Thus, the present invention provides for higher yields of synthesis gas.

In a non-limiting embodiment, the oxidized biomass is treated with the hot gas derived from the oxidized combustible material(s) for a period of time of from about 0.5 seconds to about 6.0 seconds. In another non-limiting embodiment, the oxidized biomass is treated with the hot gas for a period of time of from about 3.0 seconds to about 6.0 seconds.

When the oxidized biomass is contacted with the hot gas derived from the oxidized combustible material(s), whereby the oxidized biomass is heated to a temperature of at least 900° C., carbon in the char essentially is converted fully to generate hydrogen and carbon monoxide, and reforming of the intermediates yields more hydrogen and carbon monoxide. In general, the inorganic materials which are present in the char in general are exposed to temperatures higher than their melting points. Such melted inorganic materials, or slag, travel downwardly through the walls of the reaction vessel and thus can be withdrawn from the reaction vessel.

In a non-limiting embodiment, the biomass is gasified to produce syngas in a gasification vessel or gasifier which has a fluidized bed section and a freeboard section. The biomass is fed to the fluidized bed section of the gasifier by means known to those skilled in the art, such as, for example, through pressure tight star valves (as used in the pulp and paper sector to feed digesters) and a lock hopper system equipped with interlocking valves, and coupled to a belt conveyor which feeds a transfer screw, which ejects the biomass into the fluidized bed section of the gasifier. Alternatively, the biomass may be fed into the fluidized bed section of the gasifier by means of a compression screw working against a plug to create a pressure seal against the gasifier.

In general, the gasifier is operated at a pressure that does not exceed 3 atm. The fluidized bed section includes particles of a fluidizable material, such as alumina or olivine, having a particle size of from about 250 microns to about 850 microns. Oxygen, or oxygen and steam, is (are) introduced into the fluidized bed section of the gasifier to provide a gas velocity of from about 0.1 m/sec to about 2.5 m/sec, thereby providing a bubbling fluidized bed of the particulate material. The oxygen, or oxygen and steam, is (are) introduced into the fluidized bed section at a weight ratio of oxygen to biomass of from about 0.15 to about 0.35 of the stoichiometric weight ratio required for complete combustion of the biomass, and thereby maintaining the fluidized bed section of the gasifier at a temperature of from about 600° C. to about 750° C.

As the biomass is introduced into the fluidized bed section, the biomass is oxidized as it decomposes thermally to produce a solid carbonaceous residue that stays in the fluidized bed, gases, such as $CO_2$ and some CO and $H_2$, steam from moisture in the biomass as well as from dehydration reactions, and vapors of intermediate species such as low molecular weight saturated and non-saturated linear hydrocarbons, functionalized and condensed aromatic hydrocarbons, as well as phenolics as hereinabove described. The gases and vapors leave the fluidized bed rapidly. In general, the biomass is treated with the oxygen (elemental oxygen or oxygen containing materials such as steam and $CO_2$), in the first step, for a period of time not exceeding 4 seconds.

The solid carbonaceous material that remains in the fluidized bed reacts with the oxygen that is fed to the fluidized bed section, thereby providing the exothermal heat of oxidation as well as providing CO and $CO_2$ because the oxidation of the biomass in the fluidized bed section is substoichiometric. Elemental oxygen is consumed in the fluidized bed section, whose carbon loading essentially is constant over time. Carbon particulate is produced by thermal decomposition of the biomass, then is consumed by the oxidation, and then the smaller particles become entrained as char when the size of the particles shrinks to a size which results in their entrainment (typically less than 150 microns). The char particles also contain inorganic materials such as salts, for example, which initially are present in the biomass, or which were formed in the bed of the gasifier.

The gas and vapors produced as a result of the partial oxidation of the biomass move from the fluidized bed section of the gasifier through a disengaging zone (i.e., a zone separating the fluidized bed section from the freeboard section) prior to entering the freeboard section.

Although some cracking of the intermediate species hereinabove described takes place in the fluidized bed section of the gasifier, in general higher temperatures are required to effect conversion of the residual carbon in the entrained char particles and additionally to crack and reform the vapors of the intermediate species. Such intermediate species include low molecular weight hydrocarbons, such as methane, ethylene, ethane, monomeric and dimeric aromatic hydrocarbons, phenol, functionalized phenols, i.e., catechols, methoxylated phenol, alkylated phenol and alkoxylated phenol, and higher molecular weight hydrocarbons known as "tar," i.e., a complex mixture of functionalized polyaromatics and polyphenolic compounds.

The gas and vapors produced in the fluidized bed section pass through the disengaging zone into the freeboard section, in which the gas and vapors are contacted with the hot gas derived from the oxidized combustible material(s) to reach a temperature of from about 900° C. to about 1,200° C. The hot gas derived from the oxidized combustible material(s) is introduced into the freeboard section of the gasifier in such an amount that the velocity of the gaseous phase is maintained from about 0.5 msec. to about 3.0 m/sec. In general, gas residence times in the freeboard section of the gasifier are from about 1 second to about 6 seconds.

In the freeboard section, the phenolics are converted into simple aromatics, and tar cracking and tar reforming take place. Carbon in the char is converted predominantly to generate $H_2$ and CO, and reforming of the vapors of the intermediate hydrocarbons also generates $H_2$ and CO. Inorganic materials present in the char may melt and form a material known as slag. The slag travels down the walls of the freeboard section, and then down the walls of the fluidized bed section, and then is withdrawn from the gasifier.

The hot gas is produced by contacting at least one combustible material as hereinabove described with oxygen in order to heat the at least one combustible material to a temperature of at least 1,100° C., thereby providing the hot gas derived from the oxidized combustible material(s). Such heating takes place in an oxidation zone. In one non-limiting embodiment, the oxidation zone is disposed in the center of the freeboard section, and may be in the form of a cylindrical tube. In another non-limiting embodiment, the oxidation zone is disposed at the periphery of the freeboard section. Alternatively, the oxidation zone may be disposed at the periphery of the disengagement zone leading from the gasification zone to the freeboard section. In yet another non-limiting embodiment, the oxidation zone is distributed in the freeboard and disengagement zones to affect thermal and chemical mixing of the hot gas derived from the oxidized combustible material(s).

In another non-limiting embodiment, the oxidation zone is a separate vessel independent of the gasifier. In such an embodiment, the at least one combustible material is contacted with oxygen, or with oxygen and steam as hereinabove described, to heat the at least one combustible material to a temperature of at least 1,100° C., and to provide a hot gas derived from the oxidized combustible material(s). The latter products then are transferred through an appropriate conduit, such as those known to those skilled in the art, and into the freeboard section.

As noted hereinabove, the hot gas derived from the oxidized combustible material(s) heats the oxidized biomass in the freeboard section, thereby modifying its composition, and producing a raw synthesis gas. The raw synthesis gas then may be treated or conditioned to provide a clean synthesis gas product which may be used as a fuel or may be used to synthesize other compounds such as alcohols (e.g., methanol, ethanol, and butanol), or hydrocarbons or biofuels.

For example, the raw synthesis gas may be passed to one or more cyclones to remove particles such as char particles having a size over 8 microns. The char particles then can be heated or oxidized to provide a hot gas, which heats the oxidized biomass in the freeboard section. The synthesis gas which leaves the cyclone(s) then is subjected to further processing and purification, such as cooling, scrubbing, and stripping in order to remove impurities such as, for example, water, hydrogen chloride, ammonia, carbon dioxide, fine solids, and tars. The treated synthesis gas then may be converted to other compounds or fuels, such as biofuels, by means known to those skilled in the art.

As the synthesis gas is processed and converted to other materials, residual gases, such as methane, for example, are separated from the synthesis gas. Such residual gases may be oxidized, along with the char hereinabove described, to provide the hot gas derived from the oxidized combustible material(s), which heats the oxidized biomass in the freeboard section.

The invention now will be described with respect to the drawings, wherein.

Figure 1:
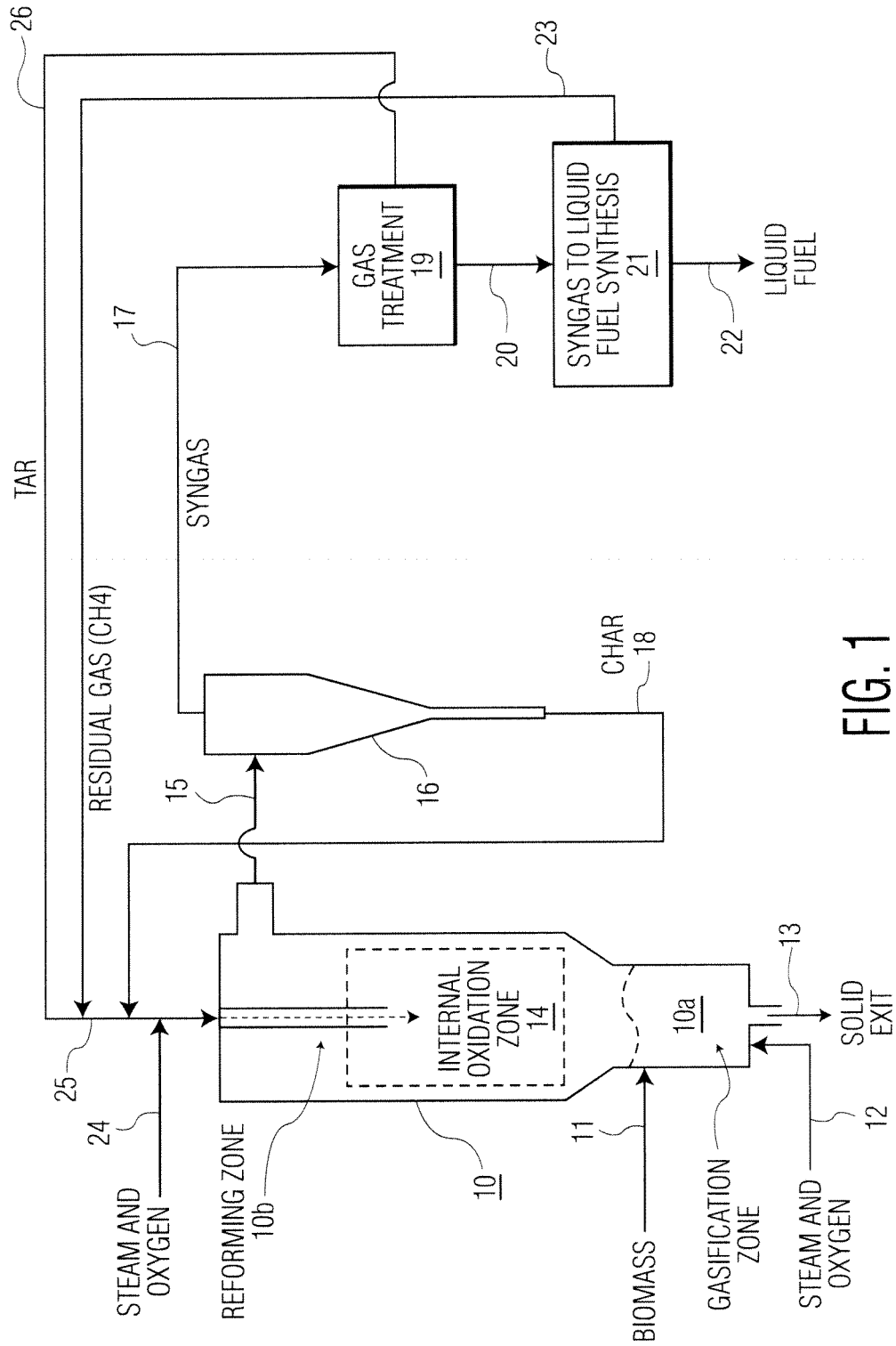
FIG. 1 is a schematic of an embodiment of the present invention in which the freeboard section, or reforming zone, of a gasifier includes an internal oxidation zone disposed in the center of the freeboard section or reforming zone.

Referring now to the drawings, as shown in FIG. 1, a biomass is fed to the gasification zone 10a of gasifier 10 through line 11. Prior to being fed to the gasification zone 10a of gasifier 10, the biomass may be pretreated with additives such as calcium oxide, mixtures of calcium oxide and magnesium oxide, ash materials, calcined limestone, iron, waste concrete, silica sand, olivine, and/or mixtures of calcium and magnesium oxides, to neutralize impurities such as chlorine, fluorine, and sulfur, which may be present in the biomass. The additives also may include ash materials, which contain metals that, once reduced in gasifier 10, may have a beneficial catalytic effect during reforming in the reforming zone or freeboard 10b. In general, such additives may be present in an amount of from about 1 wt. % to about 5 wt. %, based on the weight of the biomass, dry basis.

Line 11, through which the biomass and additives (if present) is (are) fed to the gasification zone 10a, may include a feeding system (not shown) which includes either a series of star valves or a lock hopper system with interlocking valves coupled to a weighted belt conveyor, which feeds a transfer screw to inject the biomass and additives.

Oxygen and steam are fed to gasification zone 10a through line 12. The oxygen and steam may be fed into the gasification zone 10a via a distributed nozzle system (not shown), made of, for example, stainless steel or Inconel® nozzles.

The gasification zone 10a of gasifier 10 may include a fluidized bed of an appropriate particulate material, such as alumina, olivine, dolomite, anthracite, desulfurized petroleum coke, or other refractory materials. In general, the fluidized bed material has a particle size of from about 250 microns to about 850 microns.

The gasification zone 10a of gasifier 10 is operated under conditions which effect oxidation and thermal decomposition of the biomass. In general, the temperature of the gasification zone 10a of the gasifier 10 is from about 600° C. to about 750° C., and the steam and oxygen are fed to the gasification zone 10a to provide a fluidization velocity of from about 0.1 msec. to about 2.5 msec. The fluidization velocity is maintained by the fluidization gas which is fed to the gasification zone 10a, as well as by gases formed by the conversion of biomass material in gasification zone 10a. In general, the gasification zone 10a is operated at a pressure that does not exceed 3 atm.

Oxygen is present in the fluidizing gas in an amount effective to oxidize the biomass and to heat the biomass to a temperature of from about 600° C. to about 750° C. In general, the oxygen and steam are fed to the gasification zone 10a such that the weight ratio of oxygen to biomass is from about 0.15 to about 0.35 of the stoichiometric weight ratio required for complete combustion of the biomass.

When the biomass enters the gasification zone 10a, the biomass is oxidized partially as it decomposes thermally, thereby producing a solid carbonaceous residue that remains in the gasification zone 10a, true gases ($CO_2$, steam, carbon monoxide and hydrogen) and vapors of intermediate species, such as low molecular weight saturated and non-saturated linear hydrocarbons, and alkyl and aromatic compounds, phenolics, and condensed and functionalized aromatics, which pass from the gasification zone 10a with the true gases and the fluidizing gas, to the freeboard section or reforming zone 10b.

The biomass is contacted with the fluidizing gas medium (i.e., oxygen and steam with or without $CO_2$) in the gasification zone 10a for a period of time which is effective for effecting partial oxidation and thermal decomposition of the biomass. In general, such period of time does not exceed 4 seconds.

The carbonaceous residue that remains in the gasification zone 10a reacts with the incoming oxygen to provide the exothermal heat of oxidation. Carbon monoxide and carbon dioxide are formed because the partial oxidation of the biomass is substoichiometric, and the temperature of the gasification zone 10a is maintained at from about 600° C. to about 750° C. The oxygen which was introduced into the gasification zone 10a essentially is consumed in gasification zone 10a. Carbon also is produced as a result of the thermal decomposition of the biomass. As the biomass continues to be decomposed and oxidized partially in gasification zone 10a, the carbon particles which were formed as a result of the thermal decomposition also begin to be consumed as a result of oxidation of such particles, whereby the carbon particles shrink and become entrained in the fluidizing gas as char particles. In general, such entrained char particles are less than 150 microns in size. The char particles contain inorganic materials, such as salts (e.g., alkali chlorides), initially present in the biomass, except for larger pieces of inorganic material that accumulate in gasification zone 10a. Excess solid inorganic material, which does not become entrained in the fluidizing gas, and which may be coated with carbon, is withdrawn from gasification zone 10a through line 13. A differential pressure sensor (not shown) activates a valving system (not shown) that permits adjustment of the level of the fluidized bed material in the gasification zone 10a to maintain a uniform fluidization of the fluidized bed material.

The gases, such as $CO_2$, CO, and hydrogen, and steam, and the vapors of the intermediate species hereinabove described, which are produced by the oxidation and thermal decomposition of the biomass as well as the remainder of the fluidizing gas, constitute a primary synthesis gas which passes from the gasification zone 10a into the freeboard section or reforming zone 10b of gasifier 10. Char particles also become entrained in the gases and vapors as they pass from the gasification zone 10a to the reforming zone 10b.

Some cracking of the intermediate species takes place in the gasification zone 10a; however, higher temperatures are required to crack and reform effectively the vapors of the intermediate species, and to convert the residual carbon in the entrained char particles.

The oxidized biomass, which includes a primary synthesis gas material as hereinabove described, is contacted with hot gas derived from the oxidized residual products in the freeboard section or reforming zone 10b. The hot gas is formed as a result of contacting a methane-rich gas stream from line 23 and char from line 18, which are combined in line 25, with steam and oxygen from line 24, and tar from line 26. The methane-rich gas, char, tar, steam, and oxygen are fed to an internal oxidation zone 14 from line 25. The internal oxidation zone 14 is contained in the center of the reforming zone 10b. In the internal oxidation zone 14, the methane-rich gas, char, and tar are heated to a temperature of at least 1,100° C. to provide a hot gas from the oxidized residual products. The hot gas, which, may be at a temperature of from about 1,100° C. to about 1,850° C., exits the internal oxidation zone 14 and enters the reforming zone 10b. In general, during the oxidation of the methane-rich gas, char, and tar in the oxidation zone 14, oxygen is consumed such that the hot gas from the oxidized residual products is free of elemental oxygen, or, when present, elemental oxygen is present in an amount which is sufficient to provide part of the additional heat needed to reach an adequate reforming temperature.

The oxidized biomass is contacted with the hot gas from the oxidized residual products in reforming zone 10b at a temperature and for a period of time which are effective to convert the oxidized biomass to a synthesis gas. In general, the oxidized biomass is contacted with the hot gas from the oxidized residual products in reforming zone 10b to heat the biomass to a temperature of from about 900° C. to about 1,200° C., and for a period of time of from about 0.5 seconds to about 6.0 seconds. The hot gas from the oxidized residual products is introduced into the reforming zone 10b at a velocity of from about 5 m/sec. to about 20 msec.

In the reforming zone 10b, the hot gas from the oxidized residual products provides the heat required for the reforming of intermediates in the oxidized biomass as well as conversion of carbon in the char contained in the oxidized biomass, as well as conversion of the tar, to provide hydrogen and carbon monoxide. In the oxidation zone 14, the inorganic materials in the char (such as alkali chlorides, for example) are heated to temperatures which are higher than their melting points. Such melted inorganic materials, or slag, travel downwardly through the reforming zone 10b, into the gasification zone 10a, and are withdrawn from the gasification zone 10a through line 13.

A raw synthesis gas, formed by reacting the oxidized biomass with the hot gas from the oxidized residual products in reforming zone 10b as hereinabove described, leaves the reforming zone 10b through line 15 and is passed to cyclone 16. In cyclone 16, char particles contained in the raw synthesis gas are separated from the raw synthesis gas and withdrawn from cyclone 16 through line 18. The char particles may be transported through line 18 pneumatically from the bottom of cyclone 16 with steam, carbon dioxide, and/or residual gases. The char particles then are combined with the methane-rich gas and tar in line 25, and then with steam and oxygen from line 24, and passed to oxidation zone 14 as hereinabove described, whereby the char and methane are combusted to provide a hot gas from the oxidized residual products.

The synthesis gas is withdrawn from cyclone 16 through line 17, and then is subjected to further treatment, indicated schematically as gas treatment zone 19. In gas treatment zone 19, the synthesis gas is subjected to further processing and purification, such as cooling, scrubbing, and stripping in order to remove impurities such as, for example, water, hydrogen chloride, ammonia, carbon dioxide, tar, and fine solids.

The treated synthesis gas then is withdrawn from gas treatment zone 19 through line 20, and passed to liquid fuel synthesis zone 21. Tar is withdrawn from gas treatment zone 19 through line 26, and is passed to line 25, where it is combined with a methane-rich gas from line 23, char from line 18, and steam and oxygen from line 24. In liquid fuel synthesis zone 21, the synthesis gas is converted to liquid fuels, such as biofuels, by means known to those skilled in the art. Such liquid fuels are withdrawn from liquid fuel synthesis zone 21 through line 22.

As the syngas is processed and converted to liquid fuel in liquid fuel synthesis zone 21, residual gases, and in particular methane, are removed from the liquid fuel synthesis zone 21 through line 23. The methane-rich gas in line 23 then is passed to line 25, where it is combined with char from line 18, steam and oxygen from line 24, and tar from line 26. The methane-rich gas, char, tar, and steam and oxygen then are passed to oxidation zone 14, wherein the methane-rich gas, char, and tar are reacted with the steam and oxygen to provide a hot gas derived from the oxidized residual products.

Figure 2:
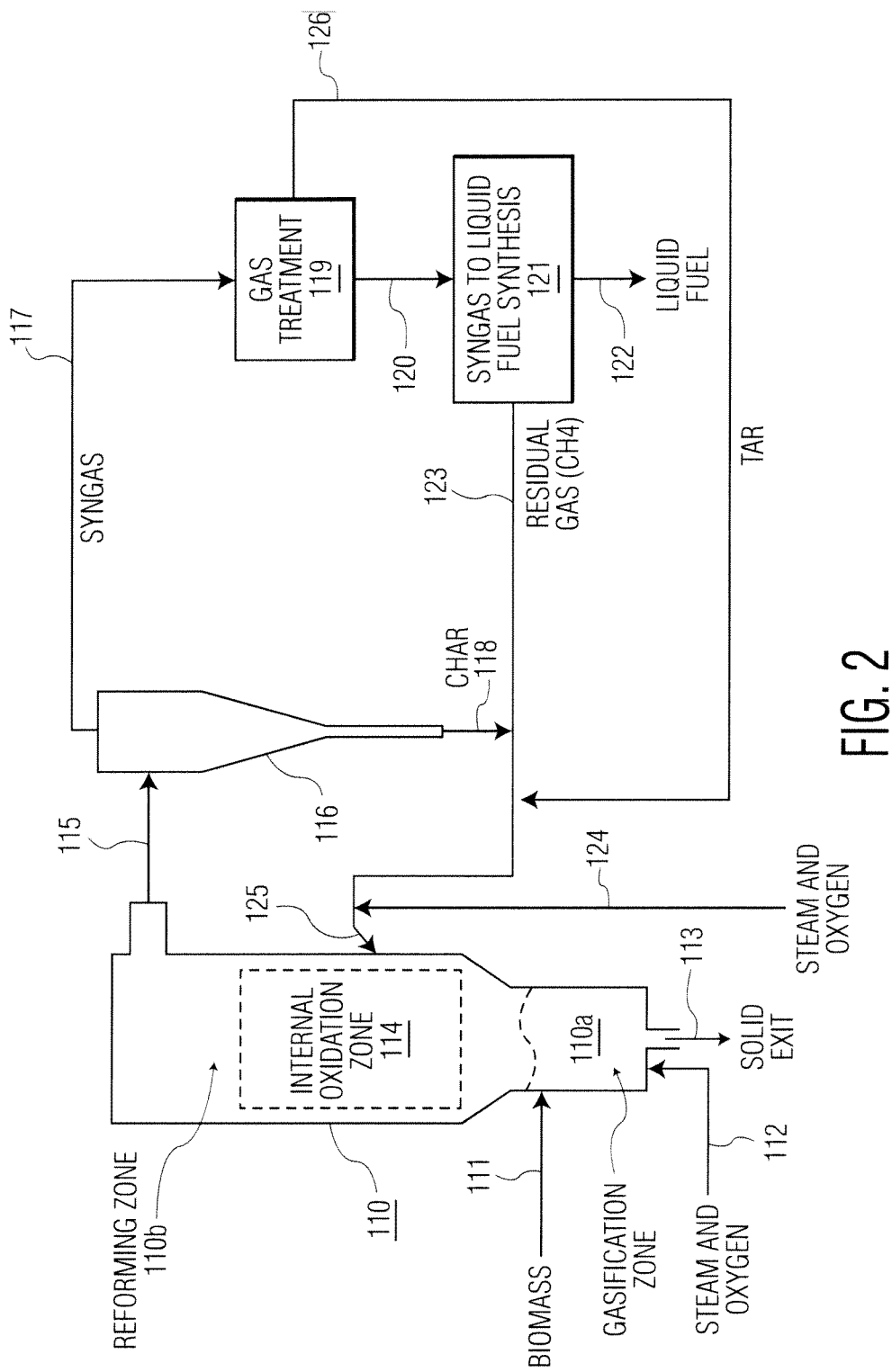
FIG. 2 is a schematic of another embodiment of the present invention in which an internal oxidation zone is disposed at the periphery of the freeboard, or reforming zone, of the gasifier.

In another embodiment, shown in FIG. 2, a biomass is fed to the gasification zone 110a of gasifier 110 through line 111. The biomass may be pretreated as hereinabove described. Oxygen and steam (with or without $CO_2$) are fed to the gasification zone 110a through line 112. The oxygen and steam may be fed into gasification zone 110a through a distributed nozzle system (not shown) as hereinabove described. The gasification zone 110a of gasifier 110 may include a fluidized bed of particles as hereinabove described.

The gasification zone 110a of gasifier 110 is operated under conditions as hereinabove described to effect oxidation and thermal decomposition of the biomass. The steam and oxygen are fed to the gasification zone 110a to provide a fluidization velocity as hereinabove described.

Oxygen is present in the fluidizing gas in an amount as hereinabove described such that the biomass is oxidized and is heated to a temperature of from about 600° C. to about 750° C.

In gasification zone 110a, the biomass is oxidized, wherein there are produced true gases such as $CO_2$, steam (including that introduced into gasification zone 110a), carbon monoxide and hydrogen, vapors of intermediate species, such as low molecular weight saturated and unsaturated linear hydrocarbons, aromatic compounds, phenolics, and condensed and functionalized aromatics, which pass from the gasification zone 110a with the true gases and the fluidizing gas, to the freeboard section or reforming zone 110b.

As a result of the partial oxidation of the biomass in gasification zone 110a, there also are produced char particles which become entrained in the fluidizing gas, and particles of excess solid inorganic material, which do not become entrained in the fluidizing gas, are withdrawn from gasification zone 110a through line 113.

The gases hereinabove described which constitute a primary synthesis gas, and char particles which have been entrained in the gas, are passed to the reforming zone 110b.

The oxidized biomass, which includes a primary synthesis gas, is contacted with a hot gas derived from the oxidized residual products in the reforming zone 110b. The hot gas is formed as a result of contacting the methane-rich gas from line 123, char from line 118, and tar from line 126, which are combined in line 125, with steam and oxygen from line 124. The methane-rich gas, char, tar, steam, and oxygen are fed to internal oxidation zone 114 from line 125. Internal oxidation zone 114 is disposed at the periphery of reforming zone 110b. In oxidation zone 114, the methane-rich gas, char, and tar are heated to a temperature of at least 1,100° C., as hereinabove described, to provide a hot flue gas derived from the oxidized residual products. The hot gas, which may be at a temperature of from about 1,100° C. to about 1,850° C., exits oxidation zone 114 and enters reforming zone 110b. In general, the hot gas derived from the oxidized residual products, as hereinabove described, is free of elemental oxygen, or, when present, elemental oxygen is present in an amount which is sufficient to provide part of the additional heat needed to reach an adequate reforming temperature together with the temperature of the hot gas derived from the oxidized residual products.

The oxidized biomass is contacted with the hot gas from the oxidized residual products in reforming zone 110b under conditions hereinabove described in order to convert the oxidized biomass to a synthesis gas. Any inorganic particles, and any slag that is formed in the oxidation zone travels downwardly and are dropped directly in the fluidized bed in the gasification zone 110a, where the inorganic particles and slag solidify. Such materials then are withdrawn from gasification zone 110a through line 113.

The raw synthesis gas then leaves reforming zone 110b through line 115 and is passed to cyclone 116. In cyclone 116, char particles are separated from the raw synthesis gas and withdrawn from cyclone 116 through line 118. The char particles are combined with the methane-rich gas and tar in line 125, and then with steam and oxygen from line 124, and passed to oxidation zone 114 as hereinabove described, whereby the char, tar, and the methane-rich gas are oxidized to provide a hot gas from the oxidized residual products.

The synthesis gas leaves cyclone 116 through line 117, and is subjected to further treatment in gas treatment zone 119. In gas treatment zone 119, the synthesis gas is subjected to further processing and purification as hereinabove described. The treated synthesis gas then is withdrawn from gas treatment zone 119 through line 120, and passed to liquid fuel synthesis zone 121, whereby the synthesis gas is converted to liquid fuels, such as biofuels. Tar is withdrawn from gas treatment zone 119 through line 126, and is passed to line 125, where it is combined with methane-rich gas from line 123, char from line 118, and steam and oxygen from line 124. The liquid fuels are withdrawn from liquid fuel synthesis zone 121 through line 122.

Residual gases, and in particular methane, are withdrawn from liquid fuel synthesis zone 121 through line 123. The methane-rich gas in line 123 then is passed to line 125, where it is combined with char from line 118, steam and oxygen from line 124, and tar from line 126. The methane-rich gas, char, tar, and steam and oxygen then are passed to oxidation zone 114, wherein the methane-rich gas, char, and tar are oxidized, and reacted with the steam and oxygen to provide a hot gas from the oxidized residual products.

Figure 3:
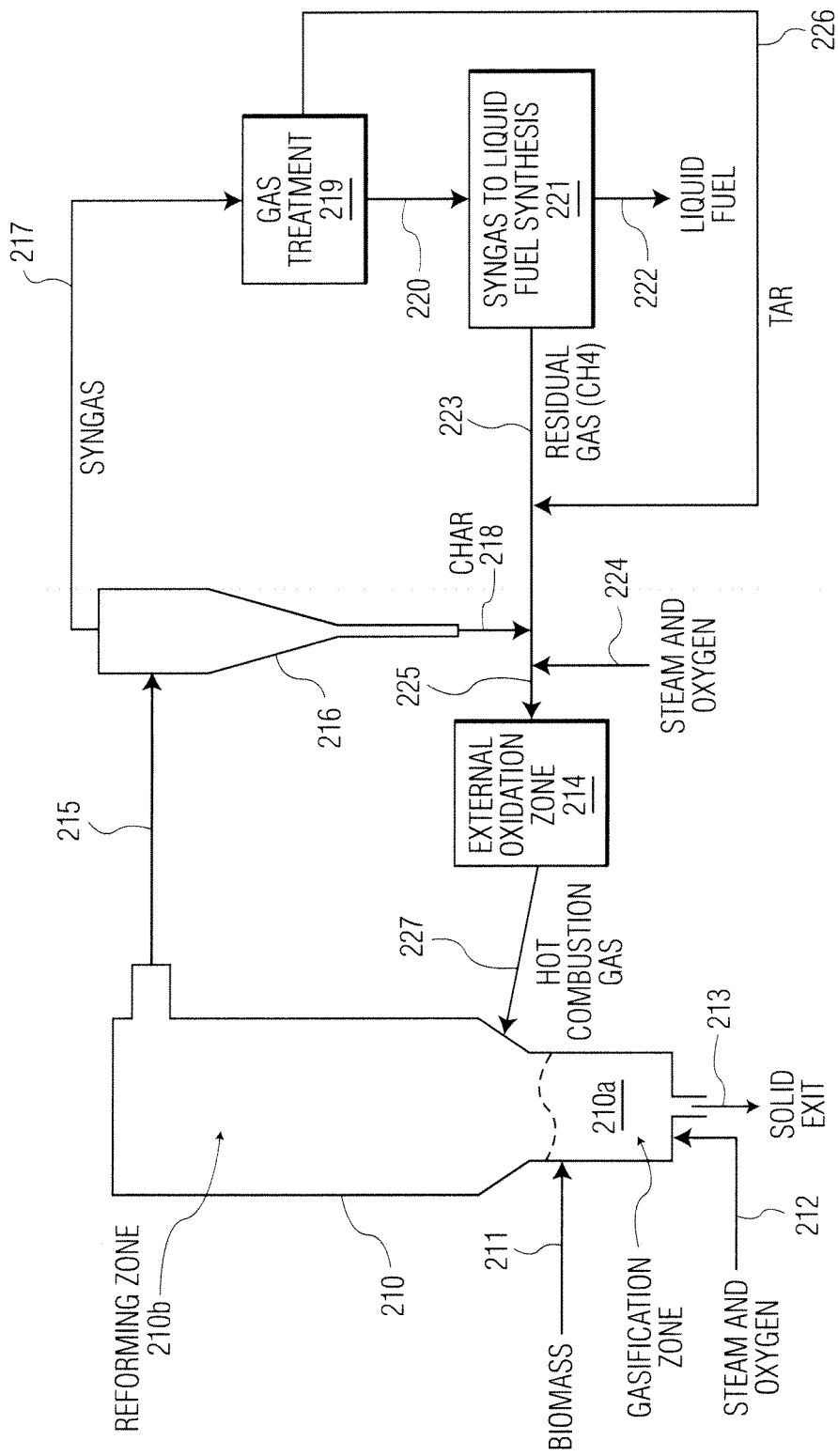
FIG. 3 is a schematic of yet another embodiment of the present invention in which there is provided an external oxidation zone which is separate from the gasifier.

In yet another embodiment, as shown in FIG. 3, a biomass is fed to gasification zone 210a of gasifier 210 through line 211, and steam and oxygen (with or without $CO_2$) are fed to gasification zone 210a through line 212. In gasification zone 210a, the biomass is reacted with the steam and oxygen under conditions hereinabove described to provide an oxidized biomass including a primary synthesis gas as hereinabove described. Excess solid inorganic materials are withdrawn from gasification zone 210a through line 213.

The oxidized biomass, which includes a primary synthesis gas, is passed from gasification zone 210a to the freeboard section or reforming zone 210b. The oxidized biomass is heated in reforming zone 210b to temperatures as hereinabove described by a hot gas from the oxidized residual products which enters reforming zone 210b through line 227. The hot gas from the oxidized residual products is provided by oxidizing char, methane-rich gas, tar, and steam and oxygen under conditions as hereinabove described in an external oxidation zone 214.

In reforming zone 210b, the oxidized biomass is heated by the hot gas derived from the oxidized residual products under conditions hereinabove described to provide a raw synthesis gas. Unreacted inorganic materials, and slag, travel down reforming zone 210*b* to gasification zone 210*a*, and are withdrawn from gasification zone 210*a* through line 213. Oxidation zone 214 also may serve as a combustor with slag removing capability.

The raw synthesis gas is withdrawn from reforming zone 210*b* through line 215 and passed to cyclone 216. In cyclone 216, char particles are separated from the raw synthesis gas and are withdrawn from cyclone 216 through line 218. The char particles are combined with a methane-rich gas from line 223, steam and oxygen from line 224, and tar from line 226, in line 225. The char, methane-rich gas, tar and steam and oxygen in line 225 are passed to oxidation zone 214, whereby the char, the methane-rich gas, and tar are oxidized to provide a hot gas derived from the oxidized residual products.

The synthesis gas, upon the removal of char particles therefrom, is withdrawn from cyclone 216 through line 217, and passed to gas treatment zone 219, whereby the synthesis gas is subjected to further processing and purification as hereinabove described. The treated synthesis gas is withdrawn from gas treatment zone 219 through line 220 and passed to liquid fuel synthesis zone 221, whereby the synthesis gas is processed to provide liquid fuels such as biofuels, for example. Tar is withdrawn from gas treatment zone 219 through line 226, and is passed to line 225, wherein it is combined with methane-rich gas from line 223, char from line 218, and steam and oxygen from line 224. Liquid fuel is withdrawn from liquid fuel synthesis zone 221 through line 222, and residual gas, and in particular methane, is withdrawn from liquid fuel synthesis zone 221 through line 223.

The methane-rich gas in line 223 is combined with char from line 218, tar from line 226, and with steam and oxygen from line 224, and passed to line 225. The methane-rich gas, char, tar, and steam and oxygen in line 225 are passed to the external oxidation zone 214, in which the methane-rich gas, char, and tar are oxidized to provide a hot gas derived from the oxidized residual products. The hot gas is withdrawn from oxidation zone 214 through line 227, and then is passed into reforming zone 210*b*, whereby the hot gas derived from the oxidized residual products heats the oxidized biomass to provide a raw synthesis gas as hereinabove described.

The invention now will be described with respect to the following examples. It is to be understood, however, that the scope of the present invention is not intended to be limited thereby.

EXAMPLE 1

Wood pellets were fed to the gasification section of a fluidized bed gasifier containing alumina particles having an average particle size of 450 microns as the fluidization material. The wood pellets were fed to the gasifier at a rate of 160 kg/hr. The wood pellets were contacted in the gasifier with a mixture of oxygen and steam, in which oxygen was present in the mixture in an amount of about 23 vol. %. The gasification section was maintained at a temperature of about 700° C. The gas flow rate to the fluidized bed of the gasification section was about 60 kg/hr. for steam and 32 kg/hr. for the oxygen.

The oxidized biomass then was passed to the freeboard section of the gasifier. In the freeboard section, the oxidized biomass was contacted with a hot gas derived from oxidized residual products, which heated the oxidized biomass to an average temperature of 950° C. The hot oxidized residual products were provided by oxidizing low molecular weight hydrocarbons in the presence of oxygen and steam in an oxidizer chamber, followed by injection of the hot oxidized residual products into the freeboard section of the gasifier. The flow rates were about 40 kg/hr. of steam, 40 kg/hr. of oxygen, and 6.5 kg/hr. of low molecular weight hydrocarbons. The oxygen percentage in the oxygen/steam mix was about 35 vol. %. The residence time of the oxidized biomass in the freeboard section of the gasifier was approximately 2 seconds. A comparison of the components of the raw synthesis gas without reforming versus treatment with the hot oxidized residual products is given in Table 1 below.

TABLE 1

| Component | Without Reforming | Reforming with Heat |
|---|---|---|
| | (mole/kg of feedstock) | (mole/kg of feedstock) |
| CO | 8.8 | 14.8 |
| $H_2$ | 8.8 | 14.8 |
| Carbon as $C_2$ and $C_3$ gases | 3.2 | 0.3 |
| | (kg/kg of feedstock) | (kg/kg of feedstock) |
| Char | 0.07 | 0.047 |
| | (mole/mole of carbon in feedstock) | (mole/mole of carbon in feedstock) |
| CO yield | 25% | 40% |

The above results show a significant increase in the amount of synthesis gas and in CO yield when the oxidized biomass is subjected to reforming by raising the temperature with the hot gas from the oxidized residual products.

EXAMPLE 2

Figure 4:
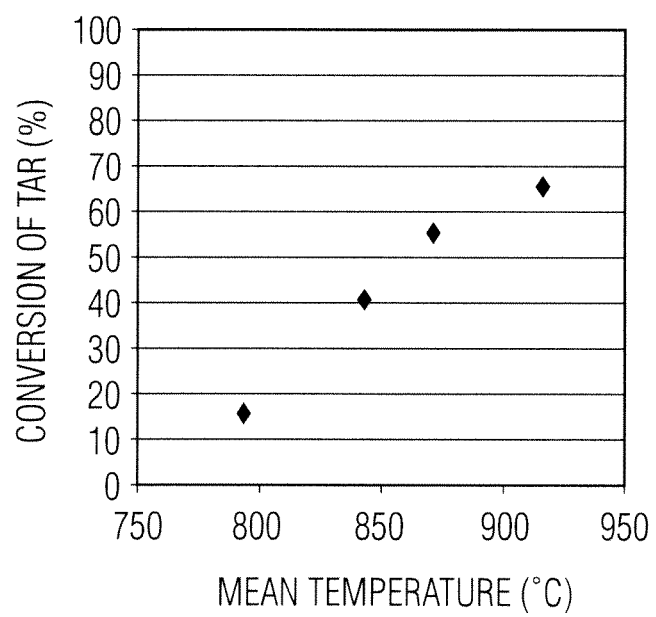
FIG. 4 is a graph of the percentage conversion of tar contained in oxidized biomass versus temperature.

A slip stream of the oxidized biomass from the fluidized bed of the gasifier was heated to various temperatures between 750° C. and 950° C. in a 1 inch diameter ceramic reformer tube in an electrical furnace to measure tar conversion. Tar was sampled at the entrance and at the exit of the reformer tube in gas spargers filled with isopropanol at −5° C. The isopropanol and water then were evaporated in a rotary evaporator and the mass of the residue (i.e., tar) was measured using an analytical grade scale. The volume of gas that was circulated in both collection gas spargers, before and after the reformer tube, was measured with two dry gas totalizers, thereby enabling one to calculate the tar concentration before and after passage through the reforming tube, and thus calculate the conversion of the gravimetric tar. The residence time was about 2 seconds. The concentration of steam at the entrance of the reformer tube was about 25 vol. %. The conversion of tar at different temperatures, as shown in FIG. 4, shows that a temperature of about 900° C. is sufficient for thermal tar reforming, and that over half of the tar can be converted at such temperatures.

The disclosures of all patents and publications, including published patent applications, are incorporated herein by reference to the same extent as if each patent and publication were incorporated individually by reference.

It is to be understood, however, that the scope of the present invention is not to be limited to the specific embodiments described above. The invention may be practiced other than as particularly described and still be within the scope of the accompanying claims.

What is claimed is:

1. A process for producing synthesis gas from biomass, comprising:

(a) contacting said biomass with oxygen, in a first vessel containing a gasification zone, in an amount effective to oxidize said biomass and to heat said biomass to a temperature no greater than 750° C.;
(b) contacting at least one combustible material with oxygen, in a second vessel containing an oxidation zone, to oxidize said at least one combustible material and to heat said at least one combustible material to a temperature of at least 1,100° C., thereby providing a hot oxidized gas;
(c) passing said hot oxidized gas produced in step (b) from said second vessel to said first vessel, whereby said oxidized biomass produced in step (a) is contacted with said hot oxidized gas produced in step (b) to heat said biomass to a temperature of at least 900° C., thereby producing a raw synthesis gas, wherein said raw synthesis gas contains at least one combustible material;
(d) separating said at least one combustible material from said raw synthesis gas produced in step (c) to provide a treated synthesis gas;
(e) passing said separated at least one combustible material of step (d) to said second vessel; and
(f) recovering said treated synthesis gas provided in step (d).

2. The process of claim 1 wherein said biomass is a homogenous biomass-rich material.

3. The process of claim 1 wherein said biomass is a non-homogeneous biomass-rich material.

4. The process of claim 1 wherein said biomass is a heterogeneous biomass-rich material.

5. The process of claim 1 wherein said biomass is urban biomass.

6. The process of claim 1 wherein, in step (a), said biomass is heated to a temperature of from about 600° C. to about 750° C.

7. The process of claim 6 wherein, in step (a), said biomass is heated to a temperature of from about 700° C. to about 750° C.

8. The process of claim 1 wherein, in step (b), said at least one combustible material is heated to a temperature of from about 1,100° C. to about 1,850° C.

9. The process of claim 8 wherein, in step (b), said at least one combustible material is heated to a temperature of from about 1,500° C. to about 1,850° C.

10. The process of claim 1 wherein, in step (c), said oxidized biomass is heated to a temperature of from about 900° C. to about 1,200° C.

11. The process of claim 10 wherein, in step (c), said oxidized biomass is heated to a temperature of from about 1,000° C. to about 1,100° C.

12. The process of claim 1 wherein said at least one combustible material from each of step (b), (c), (d), and (e) is selected from the group consisting of methane, ethylene, propylene, propane, methanol, ethanol, methyl acetate, ethyl acetate, acetic acid, dimethyl ester, tar, char, and mixtures thereof.

13. The process of claim 12 wherein said at least one combustible material is methane.

14. The process of claim 12 wherein said at least one combustible material is char.

15. The process of claim 12 wherein said at least one combustible material includes methane and char.

16. A process for producing synthesis gas from biomass, comprising:
(a) contacting said biomass in a gasification zone with oxygen in an amount effective to oxidize said biomass and to heat said biomass to a temperature no greater than 750° C.;
(b) contacting at least one combustible material with oxygen in an oxidation zone to oxidize said at least one combustible material and to heat said at least one combustible material to a temperature of at least 1,100° C., thereby providing a hot oxidized gas, wherein said at least one combustible material comprises a gas selected from the group consisting of methane, ethylene, ethane, propylene, propane, methanol, ethanol, methyl acetate, ethyl acetate, acetic acid, and dimethyl ester;
(c) contacting said oxidized biomass produced in step (a) with said hot oxidized gas produced in step (b) to heat said biomass to a temperature of at least 900° C., thereby producing a raw synthesis gas, wherein said raw synthesis gas contains at least one combustible material, wherein said at least one combustible material comprises a gas selected from the group consisting of methane, ethylene, ethane, propylene, propane, methanol, ethanol, methyl acetate, ethyl acetate, acetic acid, and dimethyl ester;
(d) separating said at least one combustible material from said raw synthesis gas produced in step (c) to provide a treated synthesis gas;
(e) passing said separated at least one combustible material of step (d) to said oxidation zone of step (b); and
(f) recovering said treated synthesis gas provided in step (d).

17. The process of claim 16 wherein said biomass is a homogeneous biomass-rich material.

18. The process of claim 16 wherein said biomass is a non-homogeneous biomass-rich material.

19. The process of claim 16 wherein said biomass is a heterogeneous biomass-rich material.

20. The process of claim 16 wherein said biomass is urban biomass.

21. The process of claim 16 wherein, in step (a), said biomass is heated to a temperature of from about 600° C. to about 750° C.

22. The process of claim 21 wherein, in step (a), said biomass is heated to a temperature of from about 700° C. to about 750° C.

23. The process of claim 16 wherein, in step (b), said at least one combustible material is heated to a temperature of from about 1,100° C. to about 1,850° C.

24. The process of claim 21 wherein, in step (b), said at least one combustible material is heated to a temperature of from about 1,500° C. to about 1,850° C.

25. The process of claim 16 wherein, in step (c), said oxidized biomass is heated to a temperature of from about 900° C. to about 1,200° C.

26. The process of claim 25 wherein, in step (c), said oxidized biomass is heated to a temperature of from about 1,000° C. to about 1,100° C.

27. The process of claim 16 wherein said at least one combustible material is methane.

* * * * *